(12) United States Patent
White

(10) Patent No.: US 8,125,164 B2
(45) Date of Patent: Feb. 28, 2012

(54) PARALLEL MOTOR CONTROLLER ARCHITECTURE

(75) Inventor: Jeffrey Joseph White, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 336 days.

(21) Appl. No.: 12/176,011

(22) Filed: Jul. 18, 2008

(65) Prior Publication Data
US 2010/0013419 A1 Jan. 21, 2010

(51) Int. Cl.
*H02P 1/54* (2006.01)
(52) U.S. Cl. ............... 318/34; 318/99; 318/568.22
(58) Field of Classification Search ............ 318/34, 318/99, 568.22, 599, 638, 51, 719, 801, 807, 318/400.04, 400.38, 400.35
See application file for complete search history.

(56) References Cited

U.S. PATENT DOCUMENTS

| | | | |
|---|---|---|---|
| 7,893,636 B2 * | 2/2011 | Lantz et al. | 318/105 |
| 2006/0061213 A1 | 3/2006 | Michalko | |
| 2007/0259545 A1 | 11/2007 | Berenger | |
| 2008/0100136 A1 | 5/2008 | Langlois et al. | |
| 2008/0111420 A1 * | 5/2008 | Anghel et al. | 307/9.1 |
| 2008/0111421 A1 | 5/2008 | Anghel et al. | |
| 2008/0137266 A1 * | 6/2008 | Jensen et al. | 361/602 |
| 2010/0066277 A1 * | 3/2010 | Bailey | 318/143 |

FOREIGN PATENT DOCUMENTS

| | | |
|---|---|---|
| EP | 1921741 A2 | 5/2008 |
| JP | 8076815 | 3/1996 |

OTHER PUBLICATIONS

International Search Report and Written Opinion dated Jun. 9, 2011 in PCT/US2009/047563.

* cited by examiner

*Primary Examiner* — Karen Masih
(74) *Attorney, Agent, or Firm* — Hope Baldauff Hartman, LLC

(57) ABSTRACT

Apparatus, methods, and computer storage media provide for the establishment of a parallel motor controller architecture and the dynamic reconfiguration of the architecture to redirect power to various motors according to the changing power load requirements of the motors. According to embodiments described herein, the present power load requirement for each motor of a group of motors is determined. The number of motor controllers to connect to each motor to provide the present power load requirement is then determined. A power switching network that connects the motor controllers to the motors is configured to connect the determined number of motor controllers to the corresponding motors. As the power load requirements of the motors changes, the power switching network is dynamically reconfigured to redirect power accordingly.

20 Claims, 12 Drawing Sheets

PARALLEL MOTOR CONTROLLER ARCHITECTURE

BACKGROUND

Motors are used in a large variety of applications. In many applications, a motor is connected to a motor controller that performs a particular function for managing the operations of the motor. For example, motors in aircraft are used to drive control surfaces, environmental systems, and many other systems. These motors typically each receive electrical power from a dedicated motor controller connected in-line between the motor and a power source. The motor controller may include any combination of rectifiers, inverters, and filters that condition the electrical signal received from the power source for use by the motor.

In aircraft and other vehicle platforms, there is typically one dedicated motor controller installed within the vehicle for every motor. Each motor controller is sized according to the peak power load demand of the motor that is serviced by the motor controller. For example, a 100 kilowatt (kW) motor would require a 100 kW motor controller, which is a motor controller that is capable of conditioning and providing 100 kW to the motor.

Motor controllers can be relatively heavy equipment. Various components of the motor controllers, such as output filters, significantly increase the overall weight of each controller. Because the weight of the motor controllers is substantially proportional to the power rating of the controller, the higher the power rating of the motor controller, the heavier the motor controller will be.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Apparatus, methods, and computer storage media described herein provide for the use of motor controllers connected in parallel to a power switching network. Each motor controller has a peak power output that is less than the peak power load requirement of the motor to which the motor controller is servicing. As power load requirements change among various motors connected to the power switching network, the allocation of power from the motor controllers is dynamically reconfigured such that any number of motor controllers may be utilized to provide power to each motor as the demand changes. In doing so, smaller motor controllers may be utilized in combination with one another to decrease the overall weight of the motor controller system when compared to a conventional system.

According to one aspect of the disclosure provided herein, a method for controlling a group of motors includes determining a present power load requirement for a motor in the group. The power load requirement for the motor is used to determine a number of motor controllers to electrically connect to the motor. A power switching network is then configured so that the motor is electrically connected to the determined number of motor controllers for supplying an adequate amount of power to the motor according to the present power load requirements of the motor.

According to another aspect, a motor control system includes a number of motors, a number of motor controllers, and a power switching network. The motor controllers are electrically connected in parallel and provide power to the motors via the power switching network. The power switching network is capable of dynamically reconfiguring electrical connections between the motor controllers and one or more motors to switch motor controllers from providing power to one motor to providing power to another motor according to a present power load requirement of a motor in the system.

According to yet another aspect, a computer determines a current load requirement of a number of motors. A power switching network is configured to electrically connect a motor to a number of motor controllers connected in parallel that will provide the present load requirement. When a change to the present load requirement of the motor is detected, the power switching network is reconfigured to alter an electrical connection of a motor controller to redirect power from the motor controller to the motor with the changing load requirement.

The features, functions, and advantages that have been discussed can be achieved independently in various embodiments of the present invention or may be combined in yet other embodiments, further details of which can be seen with reference to the following description and drawings.

DETAILED DESCRIPTION

The following detailed description is directed to apparatus, methods, and computer storage media for controlling a group of motors. As discussed briefly above, motors typically include a motor controller for configuring and providing power to the motor. In a system that includes a group of motors, there are typically an identical number of motors and motor controllers. The motor controllers are most often rated to provide a peak power load that is equivalent to or greater than the peak load of the corresponding motor.

Utilizing the concepts and technologies described herein, a system of motors includes a number of motor controllers connected in parallel to a power switching network. By utilizing this architecture as described below, the number of motor controllers and/or the power rating, or power output capability, of each motor controller may be reduced in such a manner as to reduce the overall weight of the motor system. Throughout this disclosure, embodiments are described with respect to motors and motor controllers utilized within an aircraft. An aircraft environment provides a useful example for embodiments described herein since reducing weight of an aircraft is a universal objective. However, it should be understood that the concepts presented herein are equally applicable to motor systems within any platform, including ships, vehicles, or any other platform in which size and/or weight reduction is a consideration.

Figure 1:
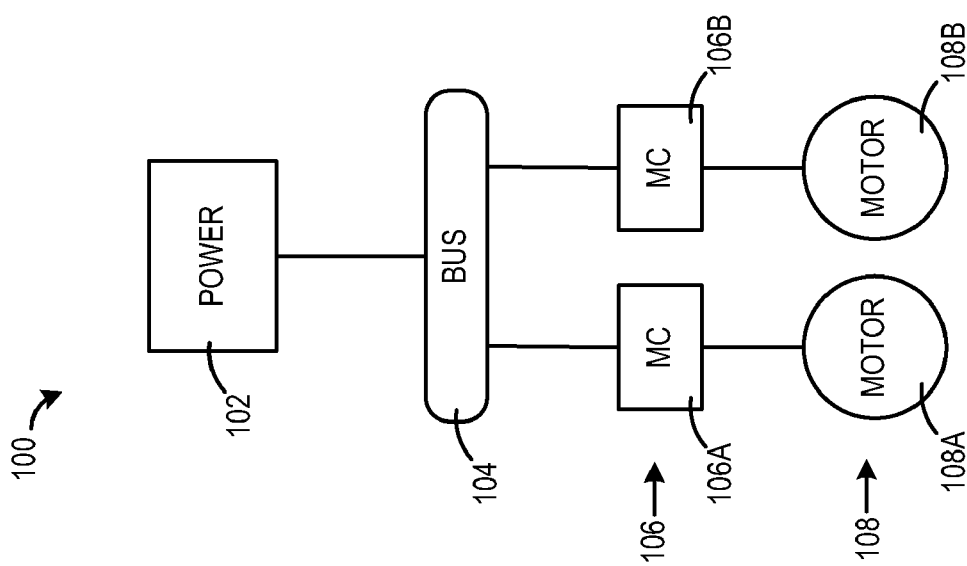
FIG. 1 is a block diagram showing a conventional motor controller architecture.

In the following detailed description, references are made to the accompanying drawings that form a part hereof, and which are shown by way of illustration, specific embodiments, or examples. Referring now to the drawings, in which like numerals represent like elements through the several figures, a parallel motor controller architecture will be described. FIG. 1 shows a conventional architecture 100 of motor controllers for providing power to motors 108. According to the conventional architecture 100, a power source 102 provides power to a bus 104, which directs power to any number of conventional motor controllers 106.

It should be appreciated that for clarity, only two conventional motor controllers 106A and 106B and corresponding motors 108A and 108B are shown. Each conventional motor controller 106 conditions the received power signal for use by a single connected motor 108. In the example shown, the conventional motor controller 106A provides power to the motor 108A, while the conventional motor controller 106B provides power to the motor 108B.

For illustrative purposes, the conventional architecture 100 may be implemented within an aircraft. According to this implementation, the power source 102 provides an alternating current (AC) or a direct current (DC) signal to the conventional motor controllers 108. Example conventional motor controllers 108A and 108B include, but are not limited to, a cabin air compressor, a hydraulic electric motor pump, a generator used for engine starting, a nitrogen generation system compressor, a fan, and a flight controls actuator. It should be appreciated that any type of motor controllers 106 and motors 108 may be utilized within any type of vehicle or other platform without departing from the scope of this disclosure.

Looking now at FIG. 2, a parallel motor controller architecture 200 will be described according to various embodiments. Similar to the example conventional architecture 100 shown in FIG. 1, the parallel motor controller architecture 200 includes the power source 102, the bus 104, and the motors 108. However, in the parallel motor controller architecture 200, there are multiple parallel motor controllers 204 that are connected in parallel to a power switching network 202. The power switching network 202 provides power from the parallel motor controllers 204 to the motors 108. The power switching network 202 includes an electrical circuit that electrically connects the parallel motor controllers 204 to the motors 108 via a series of electrical switches that enable any number of parallel motor controllers 204 to be connected to any given motor 108. The power switching network 202 may include or be connected to a computing device that controls the electronic switches to couple parallel motor controllers 204 as necessary to provide adequate power to the motors 108 according to the present power load requirements of the motors 108 as they change at any given instant in time. The operations of the power switching network 202 will be described in greater detail below.

Figure 2:
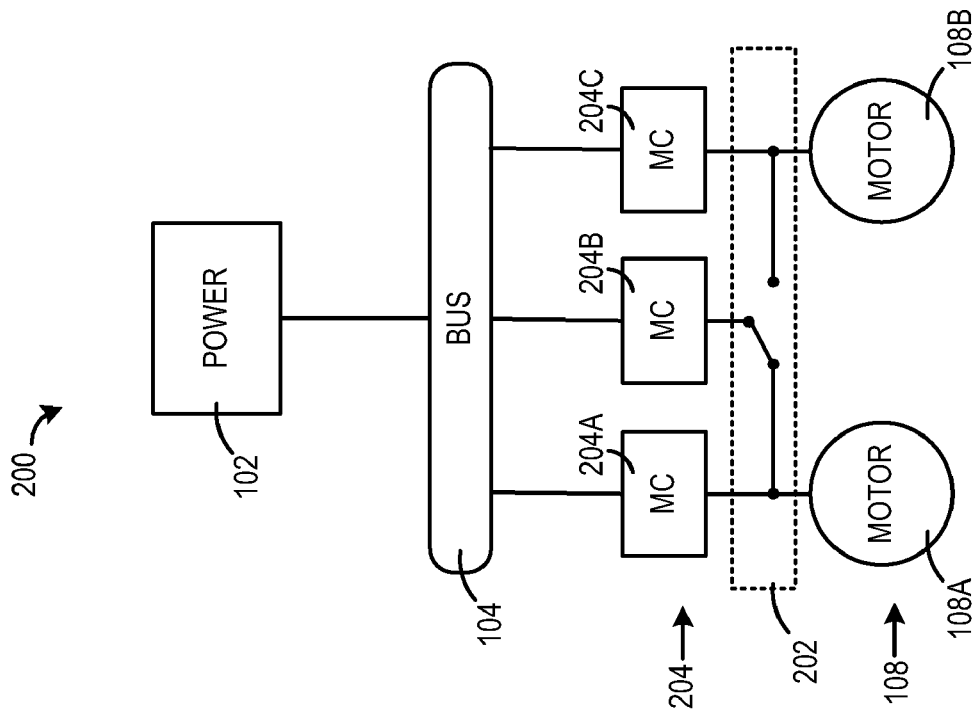
FIG. 2 is a block diagram showing a parallel motor controller architecture according to various embodiments presented herein.

In the example shown in FIG. 2, the three parallel motor controllers 204 each have a power output capability that is lower than that of the conventional motor controllers 106 shown in FIG. 1. For example, the parallel motor controllers 204A, 204B, and 204C may each be capable of providing 50 kW of power such that the combined power output capability of the motor controllers 204 is 150 kW. In contrast, the conventional architecture 100 of FIG. 1 utilizes two conventional motor controllers 106A and 106B, each having a power output capability of 100 kW for a combined power output capability of 200 kW. Because the weight of the motor controllers is typically proportional to the power output capability, the parallel motor controller architecture 200 shown in FIG. 2 may weigh less than the conventional architecture 100 shown in FIG. 1, even though three parallel motor controllers 204 are utilized in the parallel motor controller architecture 200 as opposed to two conventional parallel motor controllers 106 utilized in the conventional architecture 100.

The concepts and technologies described herein take advantage of the operational characteristics of the motors 108 in vehicle and other implementations in which the peak power loads, or the maximum power requirements, of the motors 108 do not occur simultaneously. In these implementations having complementary power loads on the motors, multiple smaller parallel motor controllers 204 can be utilized instead of the dedicated, larger conventional motor controllers 106 and be dynamically reconfigured as described herein to shift power delivery between motors 108 as the power demands of the motors 108 dictate.

It should be appreciated that the example shown in FIG. 2 is simplified for clarity. Although only three parallel motor controllers, 204A, 204B, and 204C, are shown as being connected to two motors, 108A and 108B, any number of parallel motor controllers 204 may be utilized to provide power to any number of motors 108 according to various embodiments. Similarly, the power switching network 202 is shown as including a single, simple electronic switch for clarity purposes. However, any number and type of switching mechanisms may be utilized within the power switching network 202 to combine the power outputs of the parallel motor controllers 204 for delivery to the motors 108.

Figure 3:
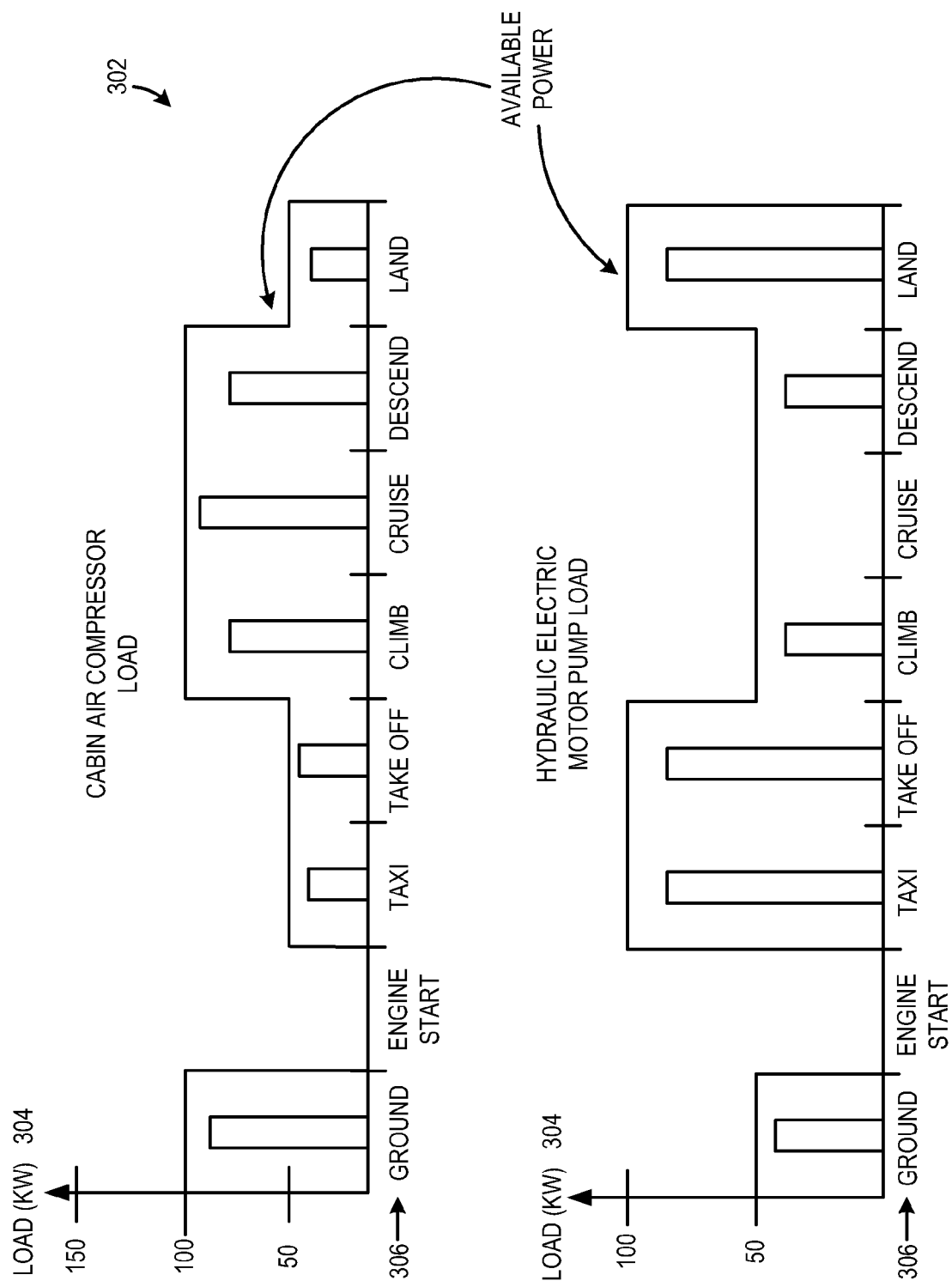
FIG. 3 is a power load chart showing an graph of a power load requirement of a cabin air compressor versus a hydraulic motor pump during different phases of aircraft flight according to various embodiments presented herein.

Turning now to FIG. 3, an illustrative power load chart 302 will be described. The power load chart 302 shows how the embodiments described herein take advantage of the complimentary power load requirements 304 of two different motors on an aircraft during different phases of flight to utilize parallel motor controllers 204 in providing power to the motors 108. In this example, the top graph shows the power load requirement 304 of a cabin air compressor during eight flight phases 306, including ground operations, engine start, taxi, take off, climb, cruise, descent, and landing. The vertical axis represents the present power load requirement 304 of the cabin air compressor.

The bottom graph shows the power load requirement 304 of a hydraulic electric motor pump during the same eight flight phases 306. Following the two graphs from left to right through the various flight phases 306, it can be seen that the available power, which is the power output capability of all of the parallel motor controllers 204 together for providing power to each of the two motors 108, remains at 150 kW. This available power could be provided utilizing the parallel motor controller architecture 200 shown in FIG. 2 in which each of the three parallel motor controllers 204 are rated at 50 kW. The combined 150 kW of the three parallel motor controllers 204 is dynamically redistributed between the cabin air compressor and the hydraulic electric motor pump as the current operational demands of the two motors 108 changes during the various flight phases 306.

As an example, it can be seen that during ground operations, 100 kW of power is provided to the cabin air compressor and 50 kW of power is provided to the hydraulic electric motor pump. To do so, two parallel motor controllers 204 are connected to the cabin air compressor and one motor controller 204 is connected to the hydraulic electric motor pump. During engine start, the motor controllers 204 may be connected to a generator so that the entire 150 kW of available power is directed to the generator for engine start. This architecture will be further described below with respect to FIG. 4B.

During taxi and takeoff the operational demands of the motors 108 leads to a reconfiguration of the power switching network 202 such that the power output to the cabin air compressor is reduced to 50 kW, while the power output from two of the parallel motor controllers 204 is redirected to the hydraulic electric motor pump. During climb, cruise, and descent, 100 kW of power is directed to the cabin air compressor and 50 kW of power is directed to the hydraulic electric motor pump. Finally, during landing when there is a higher demand on the hydraulic electric motor pump due to the lowering of landing gear and certain flight control surfaces, power is shifted to provide 100 kW of power to the hydraulic electric motor pump and 50 kW of power to the cabin air compressor.

It should be understood that the values of the power load requirements 304 of the cabin air compressor and hydraulic electric motor pump are given for illustrative purposes to show the complimentary nature of the power demands of the two motors 108 and the dynamic reconfiguration of the power switching network 202 to redistribute power as required by the power load requirements of the motors 108. It should further be appreciated that while only example data for the cabin air compressor and hydraulic electric motor pump are shown, any number and type of motors 108 may be utilized and the available power from all of the parallel motor controllers 204 is dynamically distributed between all of the motors 108.

Figure 4A:
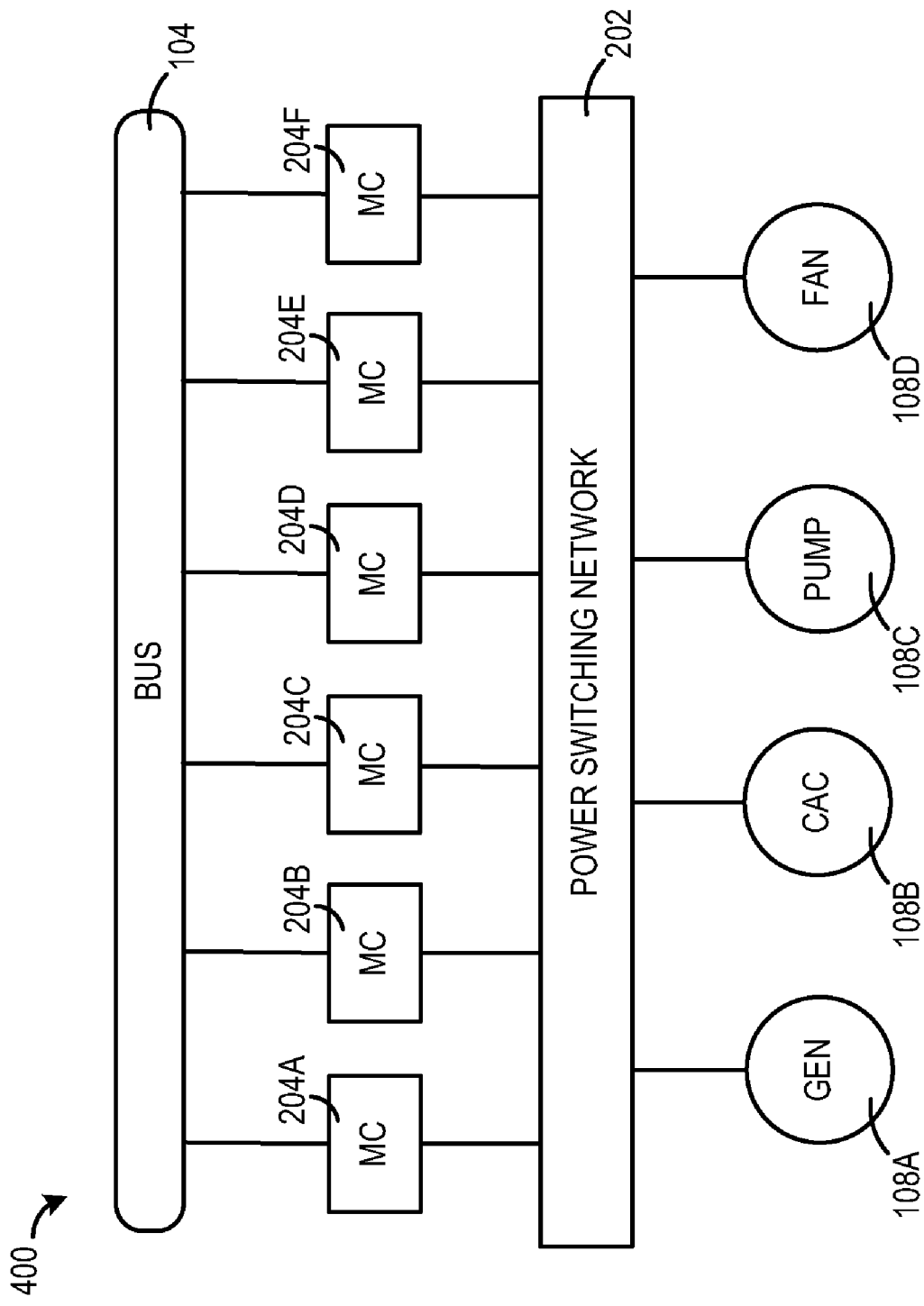
FIGS. 4A-4E are block diagrams showing examples of motor controller switching architectures according to various embodiments presented herein.

FIG. 4A shows an example power distribution system 400 that will be used throughout FIGS. 4B-4E to illustrate the dynamic reconfiguring of the electrical connections within the power switching network 202 to redirect power from one or more parallel motor controllers 204 to one or more motors 108 as the current operational demands of the motors changes during different phases of flight. Throughout these examples shown in FIGS. 4A-4E, six parallel motor controllers 204A-204F provide power to four motors 108, including a generator 108A, a cabin air compressor 108B, a pump 108C, and a fan 108D.

Figure 4B:
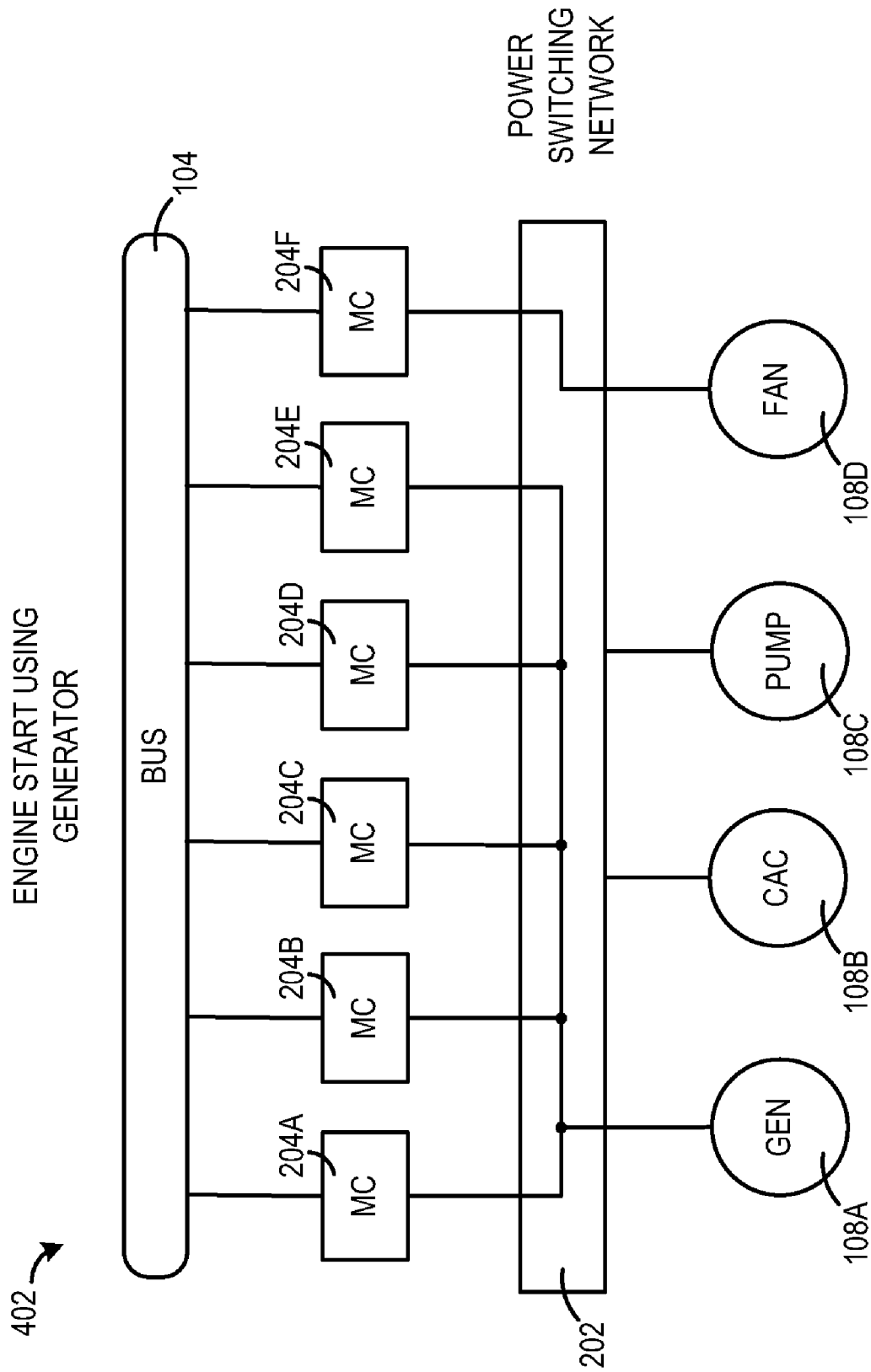

FIG. 4B shows an engine start power distribution system 402 that represents the electrical connections within the power switching network 202 during an engine start of an aircraft using the generator 108A. In this scenario, the generator 108A demands a very large power load. As a result, all of the parallel motor controllers 204A-204E are electrically connected to the generator 108A, leaving the motor controller 204F to provide some power to the fan 108D for cooling aircraft equipment.

Figure 4C:
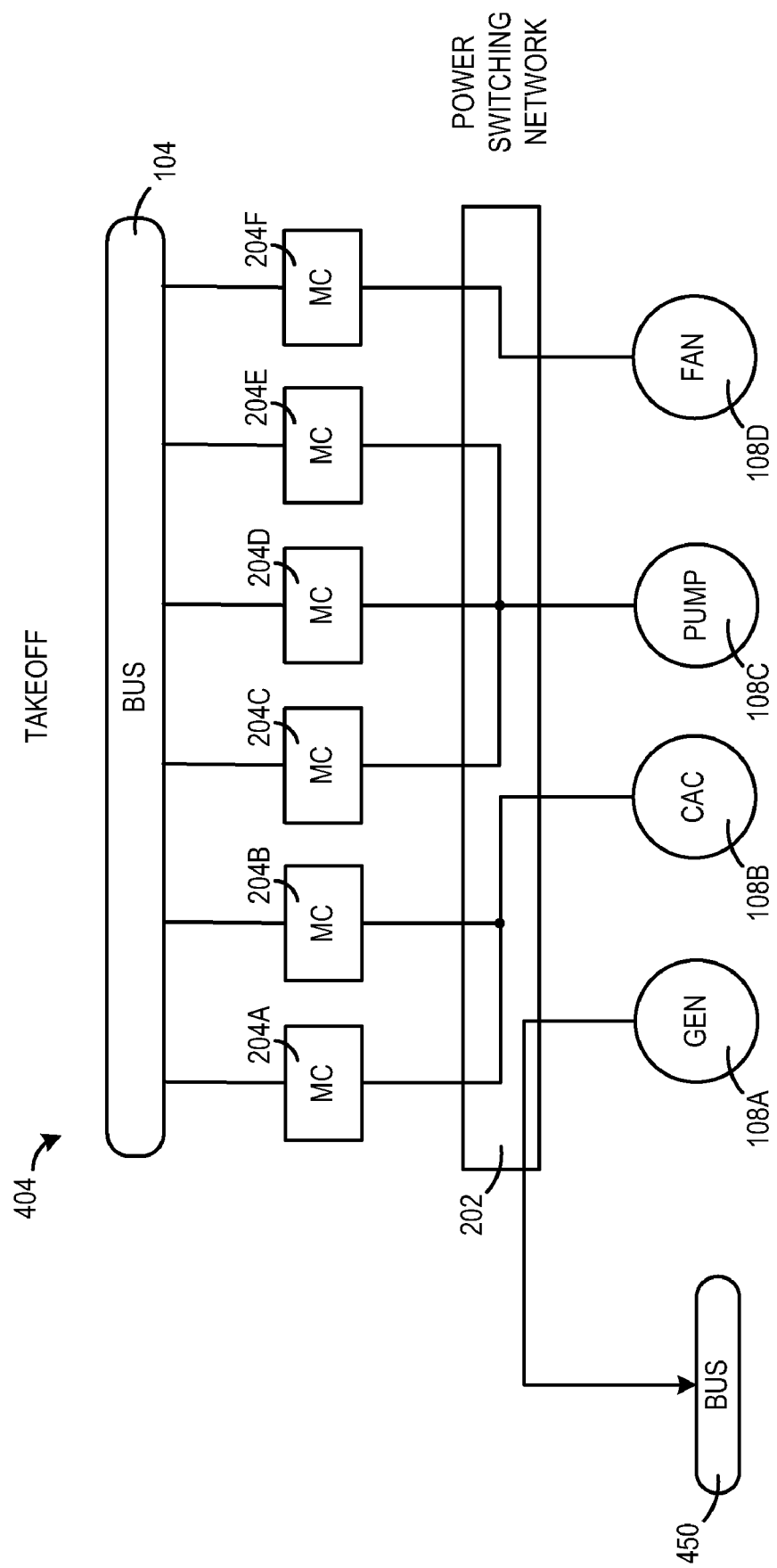

FIG. 4C shows a takeoff power distribution system 404 that represents the electrical connections within the power switching network 202 during aircraft takeoff. Because the generator 108A no longer requires power from the parallel motor controllers 204 after engine start, the generator 108A is shown to be providing power to a bus 450. The parallel motor controllers 204 that supplied power to the generator 108A during engine start have been reconfigured to supply power to the cabin air compressor 108B and the pump 108C. During takeoff, the power load requirement 304 of the pump 108C is larger than that of the cabin air compressor 108B. As a result, in this example, two parallel motor controllers 204A and 204B are connected to the cabin air compressor 108B and three parallel motor controllers 204C-204E are connected to the pump 108C.

Figure 4D:
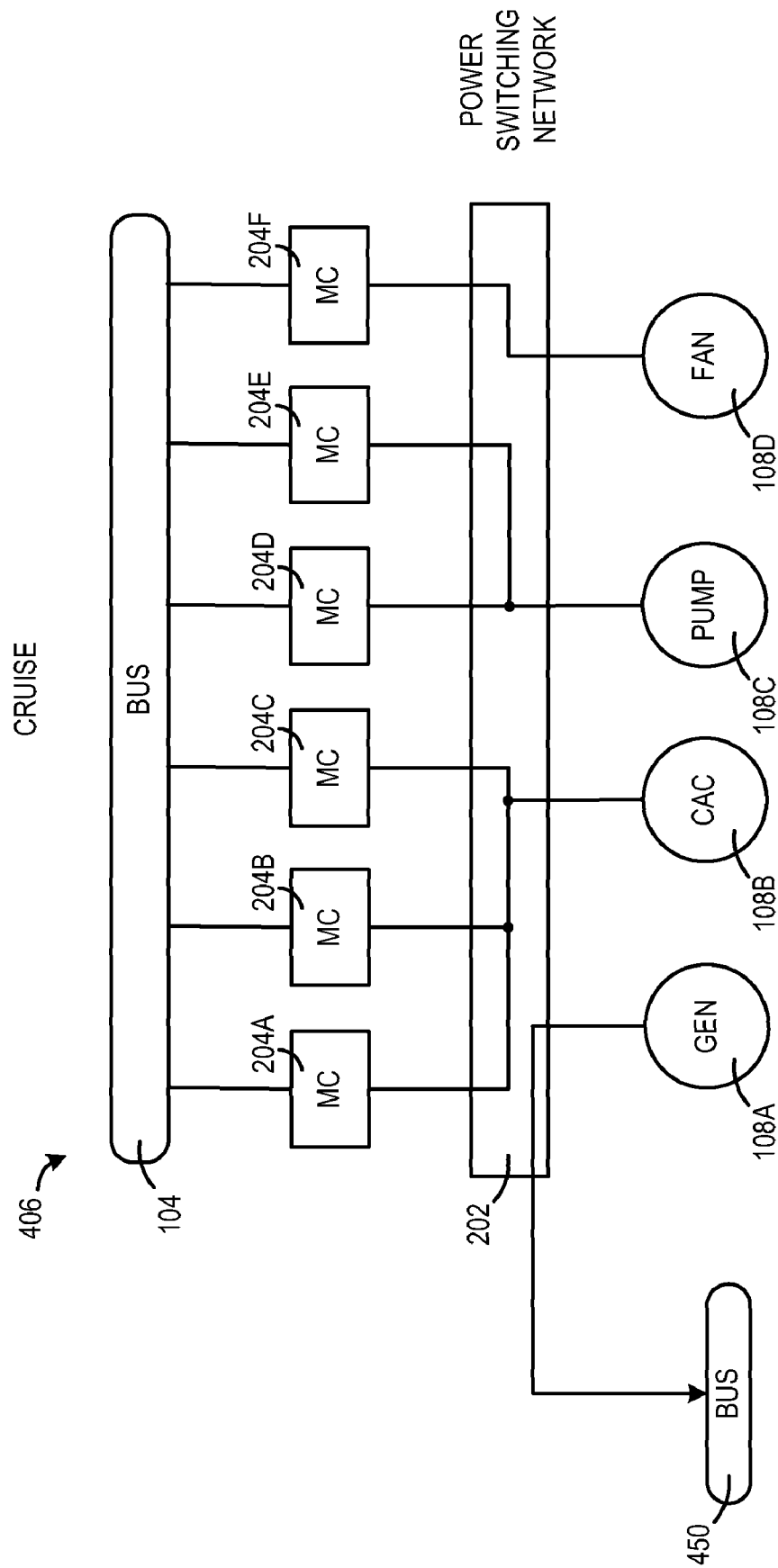

FIG. 4D depicts a cruise power distribution system 406 in which the power switching network 202 is reconfigured during cruise conditions. Because the power load requirements 304 of the cabin air compressor 108B and the pump 108C are complimentary (as shown in FIG. 3), the connection of the parallel motor controller 204C is switched from the pump 108C to the cabin air compressor 108B during cruise to satisfy the higher power load demands of the cabin air compressor 108B.

Figure 4E:
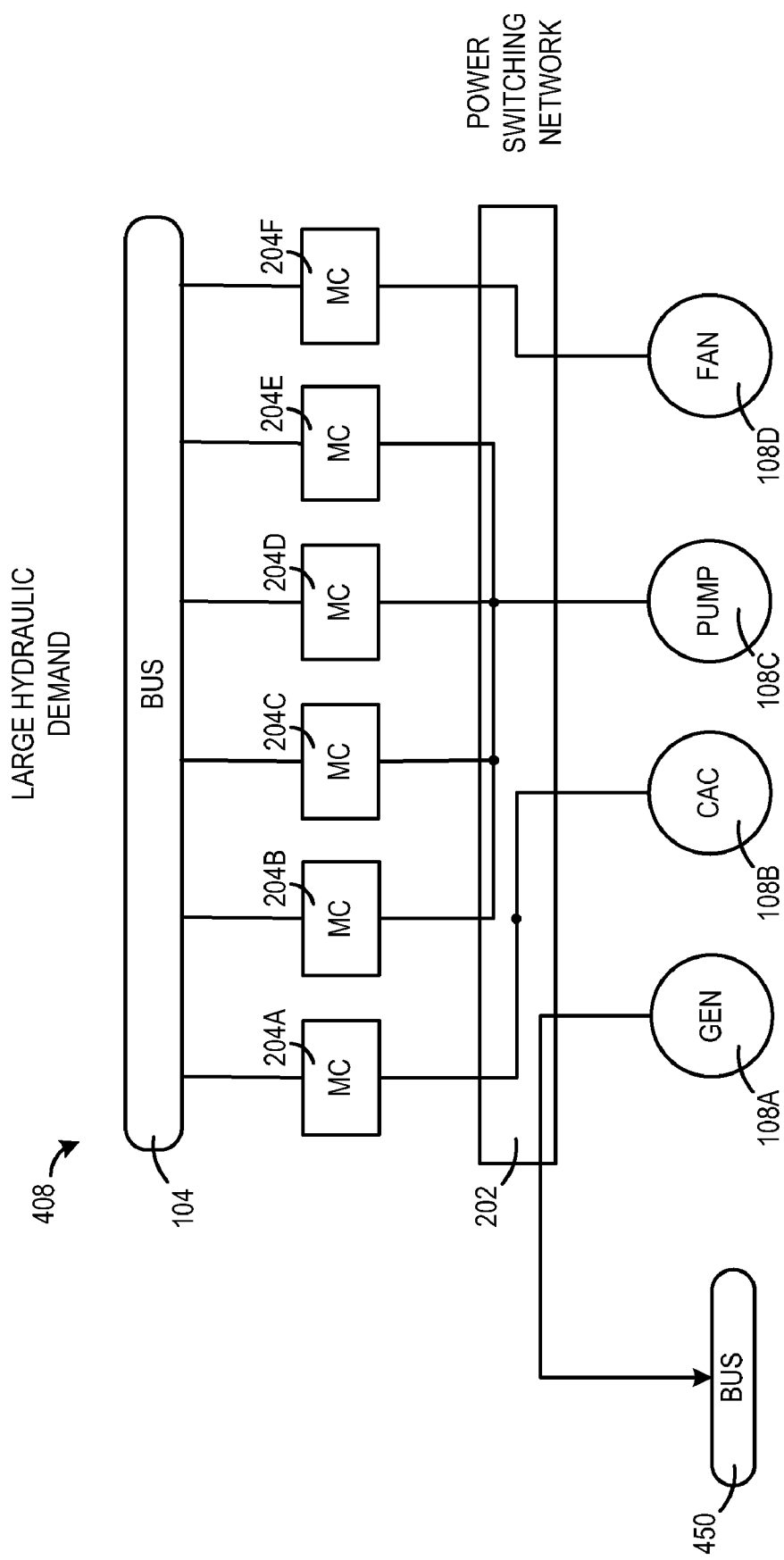

FIG. 4E shows a hydraulic demand power distribution system 408 in which the power switching network 202 is reconfigured during temporary hydraulic conditions such as raising or lowering the landing gear and reversing the thrust of the engines. As can be seen, four of the six parallel motor controllers 204 are electrically connected to the pump 108C. As is the case in any of the scenarios presented, as soon as the high power load requirement 304 of the pump 108C subsides, the power switching network 202 is again reconfigured according to the present power load requirements 304 of all of the motors 108.

Figure 5A:
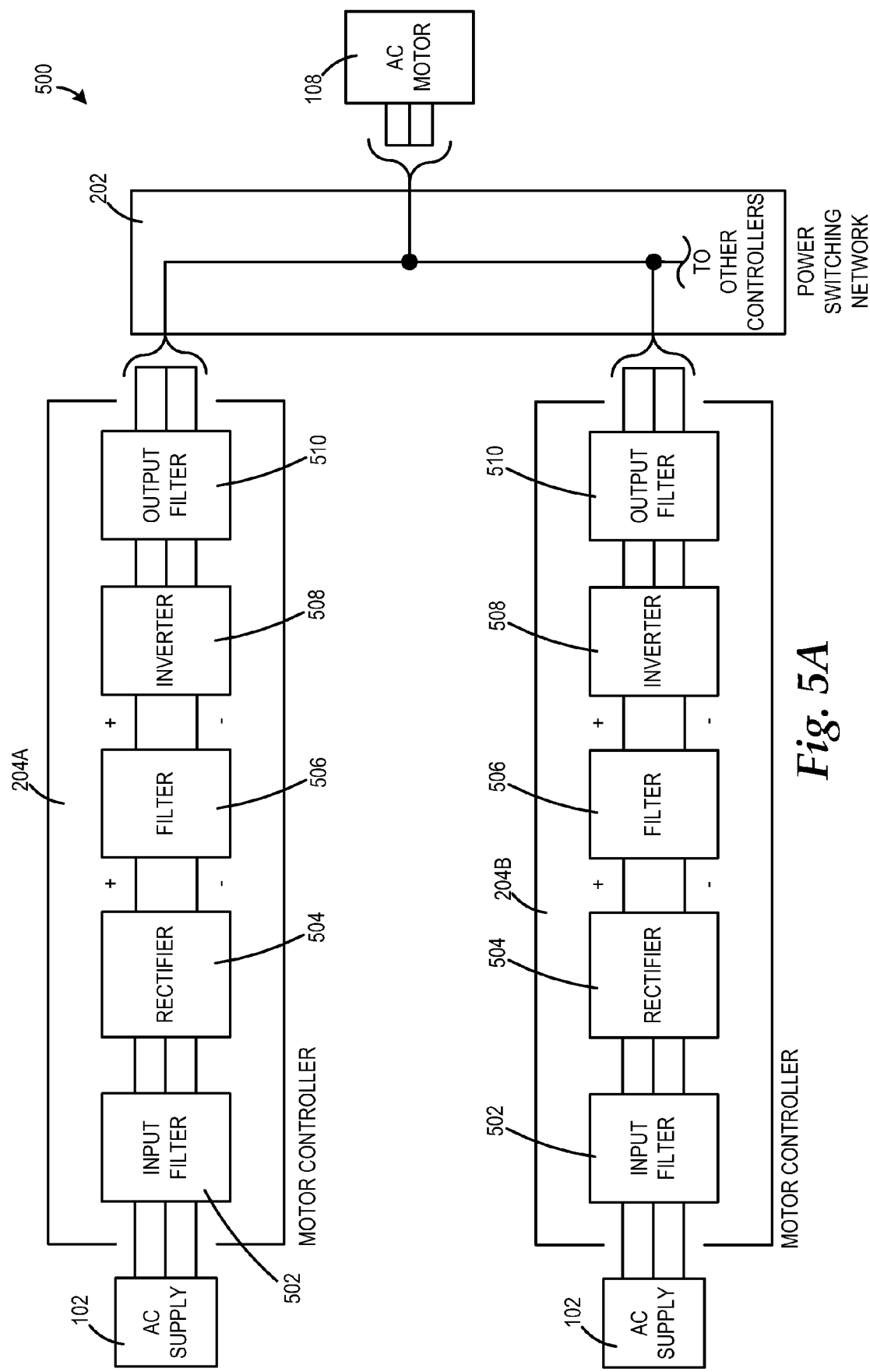
FIGS. 5A-5C are block diagrams showing implementations utilizing alternative placements of output filter within a motor controller system according to various embodiments presented herein.
Figure 5B:
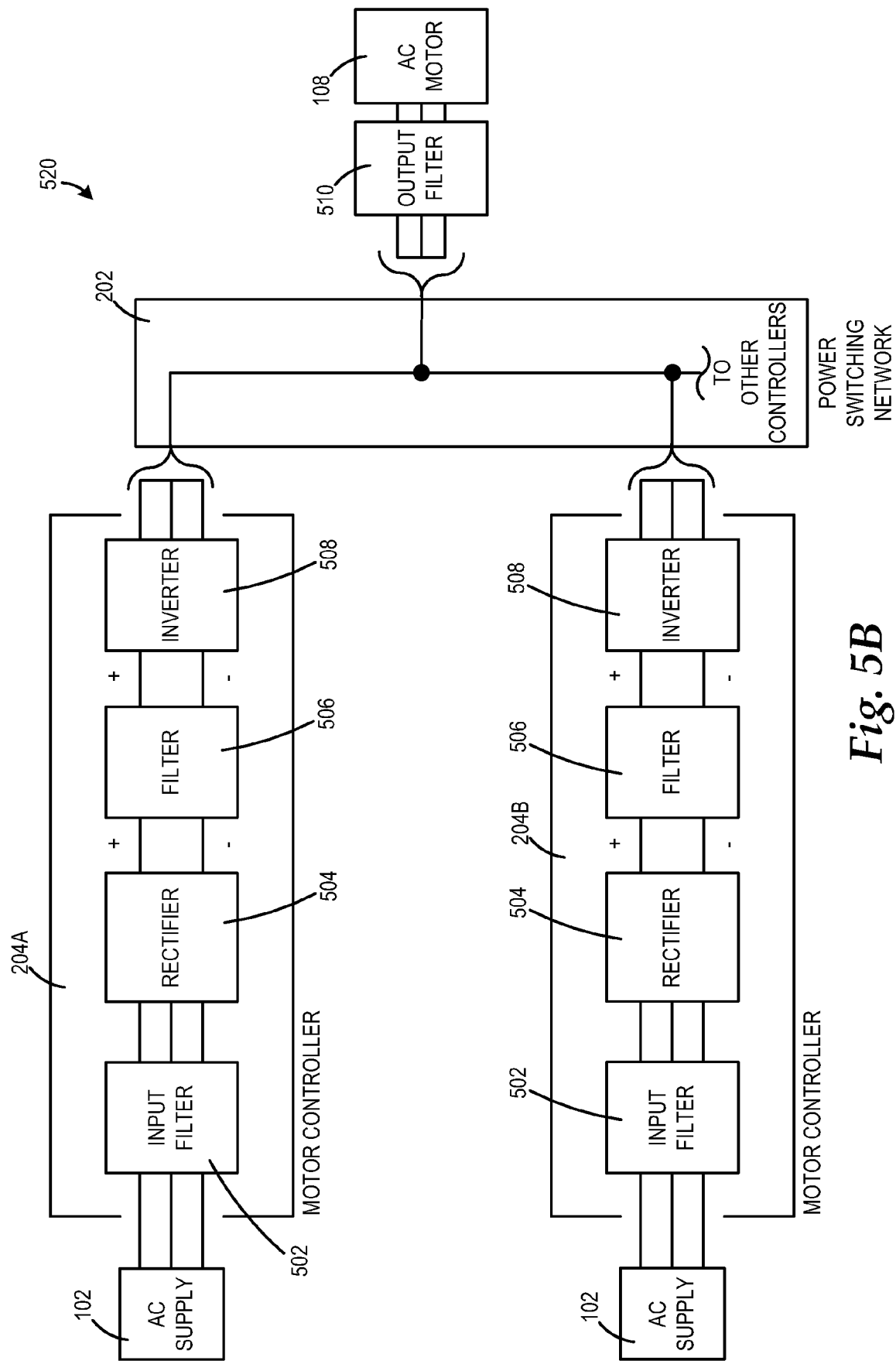
Figure 5C:
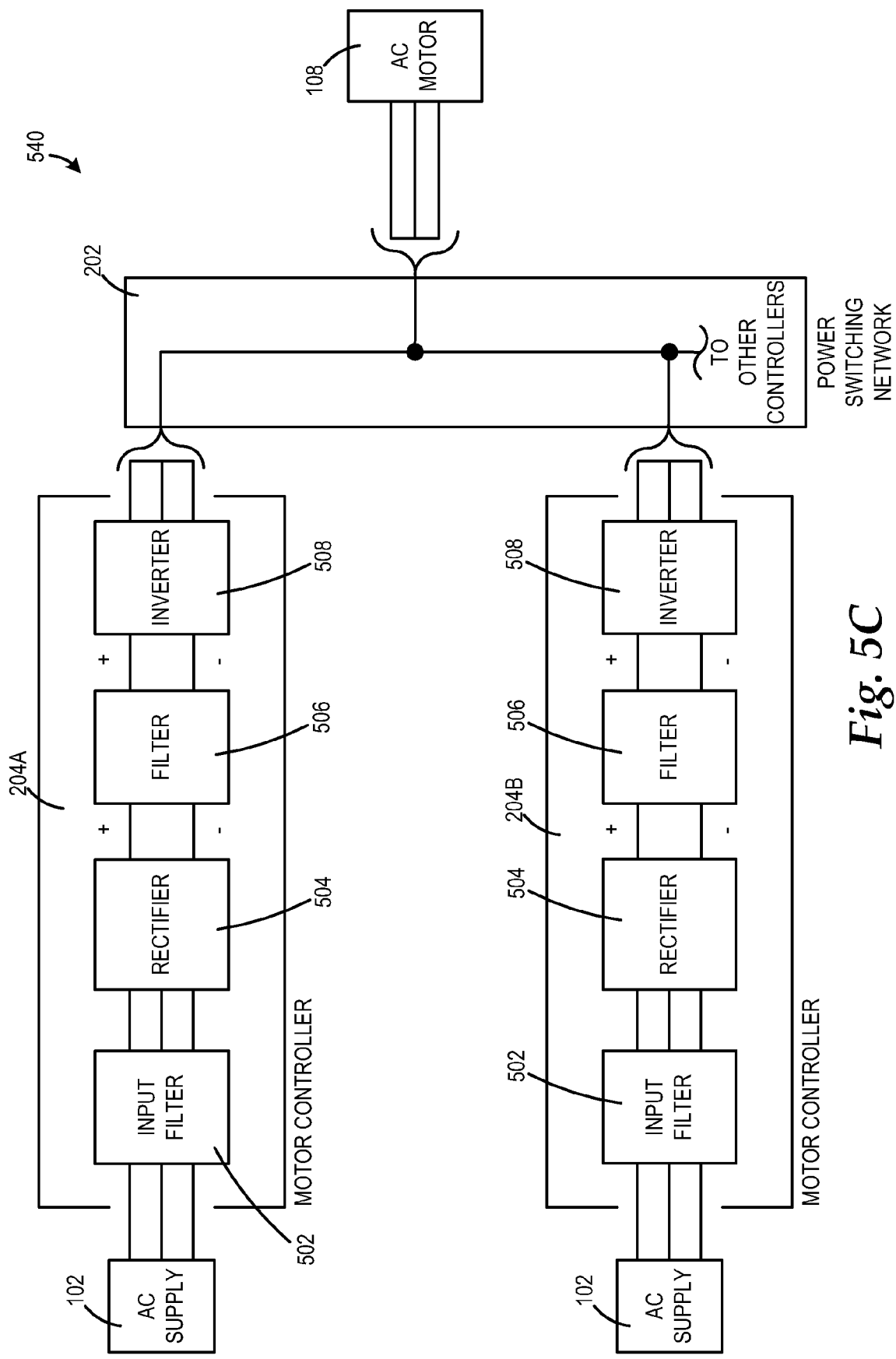

FIGS. 5A-5C show alternative configurations 500, 520, and 540, respectively, of a motor controller system to illustrate various placements of an output filter 510 according to various embodiments. Conventional motor controllers 106 utilize filters to aid in conditioning electronic signals for use by a motor 108. FIG. 5A shows one embodiment in which parallel motor controllers 204A and 204B are connected to the power switching network 202 for providing power to the motor 108. In this example, the power source 102 provides an AC signal to the parallel motor controllers 204.

Each motor controller 204 includes an input filter 502, output filter 510, and intermediate filter 506 that is positioned between a rectifier 504 and an inverter 508. It should be appreciated that the components of the parallel motor controllers 204 are not limited to those shown in FIGS. 5A-5C and that the components of any given parallel motor controller 204 may vary from those shown. For example, when the power source 102 provides DC input to the parallel motor controllers 204, the parallel motor controllers 204 may include an input filter 502, an inverter 508, and an output filter 510, without requiring a rectifier 504 or any additional filters.

FIG. 5B shows an alternative motor controller configuration 520 in which the parallel motor controllers 204 share a single output filter 510. In this embodiment, an output filter 510 may be connected to the motor 108 so that power received from the power switching network 202 is input into the output filter 510 prior to receipt by the motor 108. Doing so allows for the removal of the output filters 510 from the parallel motor controllers 204. Sharing an output filter 510 rather than including an output filter 510 within every parallel motor controller 204 saves overall system weight since filters can be relatively heavy components.

To further save weight, the embodiment shown in FIG. 5C shows an alternative motor controller configuration 540 in which one or more parallel motor controllers 204 do not utilize the output filter 510. Typically, the output filters 510 are used due to the length of the power feeders from the parallel motor controllers 204 in an equipment bay of an aircraft or other vehicle to the motors 108. The electrical signal from the parallel motor controllers 204 may be configured as pulse-width modulated or switched (square) waveforms that include significant harmonic content that gets amplified by the impedance of the power feeders by the time that the signals are received by the motors 108. The output filters 510 within the parallel motor controllers 204 smooth out the waveforms and prevent damage to the motors 108 caused by the amplified harmonics of the unfiltered square waveforms. However, in embodiments in which the parallel motor controllers 204 are located close to the motors 108, or if radiated emissions from the power feeders are not a consideration, then the alternative motor controller configuration 540 shown in FIG. 5C that does not include any output filters 510 may be used to further minimize the weight of the motor controller system.

Figure 6:
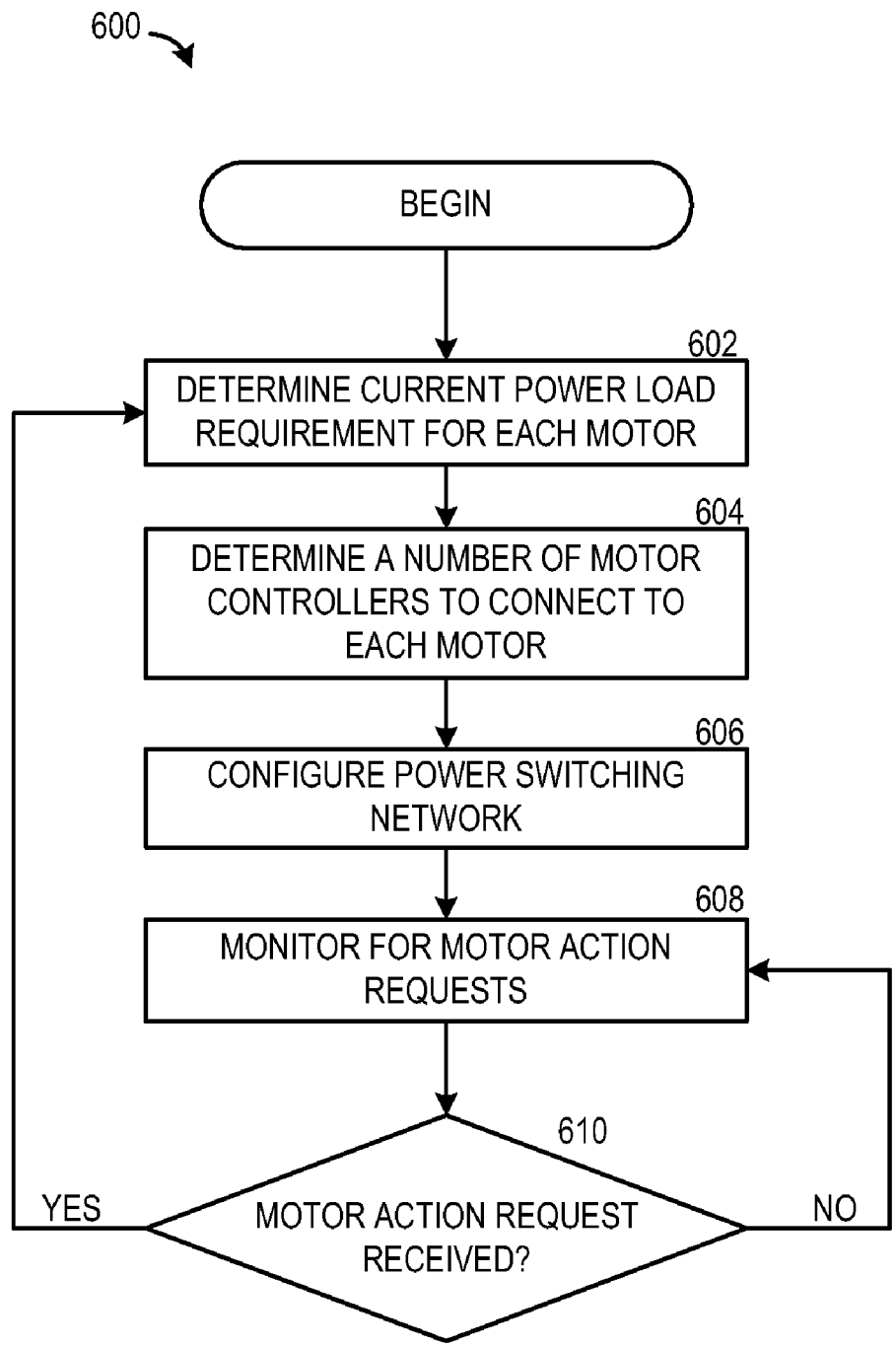
FIG. 6 is a flow diagram illustrating a method for controlling a group of motors according to various embodiments presented herein.

Turning now to FIG. 6, an illustrative routine 600 for controlling a group of motors 108 will now be described in detail. It should be appreciated that the logical operations described herein are implemented (1) as a sequence of computer implemented acts or program modules running on a computing system and/or (2) as interconnected machine logic circuits or circuit modules within the computing system. The computing system may be a part of or connected to the power switching network 202 and will be described below with respect to FIG. 7. The implementation of the logical operations described herein is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 600 begins at operation 602, where the present power load requirements 304 of each motor 108 are determined. This operation and others may be performed by a motor controller reconfiguration application executing on the computer system, either as part of the power switching network 202 or in communication with the power switching network 202. As described above, the present power load requirement 304 of a motor 108 represents the operational power demand at that instance in time. As illustrated in FIG. 3, the present power load requirement 304 of a motor 108 within an aircraft or other vehicle or platform may change according to an operational phase, such as various flight phases 306. The present power load requirements 304 of different motors 108 may be complimentary such that an increase in a power requirement for one motor 108 coincides with a corresponding decrease in a power requirement for another motor 108, which allows for the dynamic reconfiguration of the electrical connections within the power switching network 202 as described herein.

From operation 602, the routine 600 continues to operation 604, where the number of parallel motor controllers 204 to be connected to each motor 108 is determined. As described above, the number of parallel motor controllers 204 to be connected to any given motor 108 may include the least number of parallel motor controllers 204 that are capable of supplying the present power load requirement 304 of the particular motor 108. For example, if a motor 108 is utilizing 100 kW of power, then two parallel motor controllers 204 capable of each providing 50 kW of power are connected to the motor 108. At operation 606, the power switching network 202 is configured according to connect the parallel motor controllers 204 to the motors 108 according to the present power load requirements of the motors as determined at operation 604. It should be appreciated that the power switching network 202 is configured by activation of any number of electronic switches within a circuit connecting the parallel motor controllers 204 to each of the motors 108.

From operation 606, the routine 600 continues to operation 608, where the motor controller system is monitored for motor action requests. According to one embodiment, a motor action request may be any activation or motion of a switch, lever, control device, or other apparatus used to control a system that utilizes one or more motors 108. For example, in an aircraft environment, a motor action request may include, but is not limited to, the lowering or raising of landing gear, the activation or motion of a control for moving a flight control surface, and the activation of a pump. It should be appreciated that the motor action request may be the result of an action taken by a person or may be the result of a computer-controlled action. It should also be understood that the monitoring operation may include active monitoring or polling of any number of systems, or may be passive monitoring such as the receipt of a request.

At operation 610, if a motor action request is not received, then the routine 600 returns to operation 608 and the monitoring continues. However, if at operation 610, it is determined that a motor action request has been made or received, then the routine 600 returns to operation 602, where the present power load requirements 304 of the motors 108 is reassessed and the routine 600 continues as described above. In this manner, the power switching network 202 may be dynamically reconfigured so as to respond to changes in the power load requirements 304 of the motors 108 by redirecting power from the parallel motor controllers 204 to the applicable motors 108.

Figure 7:
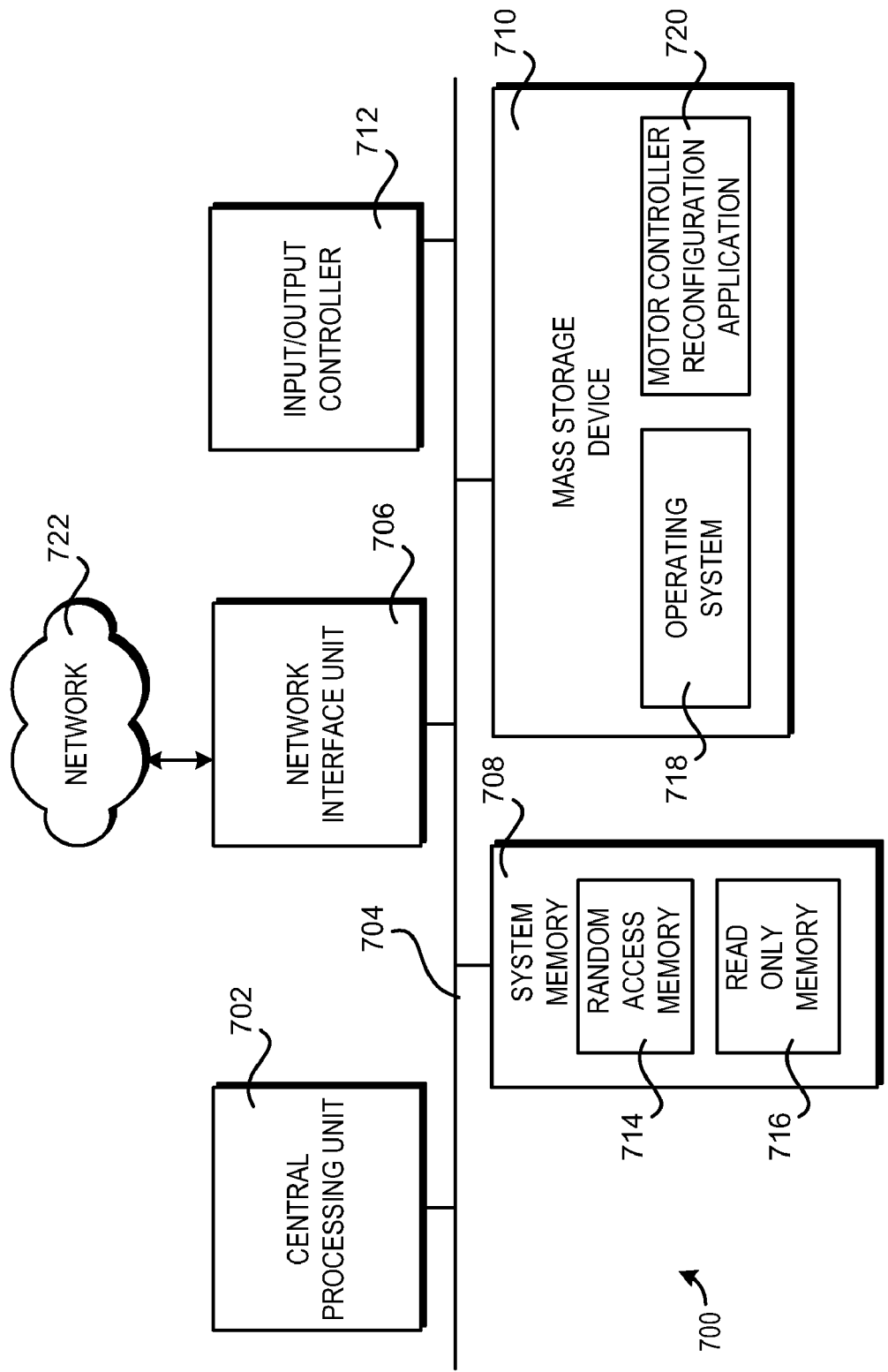
FIG. 7 is a computer architecture diagram showing an illustrative computer hardware and software architecture for a computing system capable of implementing aspects of the embodiments presented herein.

FIG. 7 shows an illustrative computer architecture for a computer 700 capable of executing the software components described herein for providing power and to a group of motors 108 in the manner presented above. The computer architecture shown in FIG. 7 illustrates a conventional desktop, laptop, or server computer and may be utilized to execute any aspects of the methods presented herein. As described above, the computer 700 may be a part of the power switching network 202 or may be communicatively linked to the power switching network 202.

The computer architecture shown in FIG. 7 includes a central processing unit 702 (CPU), a system memory 708, including a random access memory 714 (RAM) and a read-only memory (ROM) 716, and a system bus 704 that couples the memory to the CPU 702. A basic input/output system containing the basic routines that help to transfer information between elements within the computer 700, such as during startup, is stored in the ROM 716. The computer 700 further includes a mass storage device 710 for storing an operating system 718, application programs, and other program modules, which are described in greater detail herein.

The mass storage device 710 is connected to the CPU 702 through a mass storage controller (not shown) connected to the bus 704. The mass storage device 710 and its associated computer-readable media provide non-volatile storage for the computer 700. Although the description of computer-readable media contained herein refers to a mass storage device, such as a hard disk or CD-ROM drive, it should be appreciated by those skilled in the art that computer-readable media can be any available computer storage media that can be accessed by the computer 700.

By way of example, and not limitation, computer-storage media may include volatile and non-volatile, removable and non-removable media implemented in any method or technology for storage of information such as computer-readable instructions, data structures, program modules or other data. For example, computer-storage media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 700.

According to various embodiments, the computer 700 may operate in a networked environment using logical connections to remote computers through a network such as the network 722. The computer 700 may connect to the network 722 through a network interface unit 706 connected to the bus 704. It should be appreciated that the network interface unit 706 may also be utilized to connect to other types of networks and remote computer systems. The computer 700 may also include an input/output controller 712 for receiving and processing input from a number of other devices, including a keyboard, mouse, or electronic stylus (not shown in FIG. 7). Similarly, an input/output controller may provide output to a display screen, a printer, or other type of output device (also not shown in FIG. 7).

As mentioned briefly above, a number of program modules and data files may be stored in the mass storage device 710 and RAM 714 of the computer 700, including an operating system 718 suitable for controlling the operation of a networked desktop, laptop, or server computer. The mass storage device 710 and RAM 714 may also store one or more program modules. In particular, the mass storage device 710 and the RAM 714 may store the motor controller reconfiguration application 720 that is operative to perform the operations described above. The mass storage device 710 and the RAM 714 may also store other types of program modules.

Based on the foregoing, it should be appreciated that technologies for reconfiguring a power switching network 202 to redirect power from any number of parallel motor controllers 204 to one or more motors 108 as the present power load requirements 304 of the motors 108 change are provided herein. Utilizing the embodiments described herein, the number of parallel motor controllers 204 that service a group of motors 108 within an aircraft, vehicle, or other platform may increase or remain the same as with conventional systems. However, because the dynamic reconfiguration of the electrical connections within the power switching network 202 connecting the parallel motor controllers 204 to the motors 108 as described herein allows for power output capability of the parallel motor controllers 204 to be reduced, the overall weight of a motor controller system may be reduced.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for controlling a plurality of motors, comprising:
   determining a present power load requirement for a motor of the plurality of motors;
   determining a number of motor controllers of a plurality of motor controllers to electrically connect to the motor of the plurality of motors according to the present power load requirement of the motor; and
   configuring a power switching network such that the motor is electrically connected to the number of motor controllers determined for supplying power to the motor according to the present power load requirement of the motor.

2. The method of claim 1, wherein determining the power load requirement for the motor comprises determining a minimum power requirement for the motor according to a current operational demand of the motor, and wherein determining the number of motor controllers to electrically connect to the motor comprises determining the number of motor controllers sufficient to provide at least the minimum power requirement of the motor according to a power output capability of each motor controller and the minimum power requirement determined for the motor.

3. The method of claim 2, wherein the plurality of motor controllers comprises a total number of motor controllers greater than a total number of motors, and wherein the power output capability of any one of the plurality of motor controllers is less than a maximum power load requirement of one motor of the plurality of motors.

4. The method of claim 2, further comprising:
   receiving a request for a motor action that changes the present power load requirement on the motor of the plurality of motors; and
   in response to the request for the motor action, reconfiguring the power switching network such that power from one of the number of motor controllers is redirected to or from the motor to enable the motor action.

5. The method of claim 4, wherein receiving the request for the motor action that changes the present power load requirement on the motor of the plurality of motors comprises receiving input from an aircraft control, wherein the aircraft control operates the motor to drive an aircraft system.

6. The method of claim 1, wherein the plurality of motor controllers are configured in parallel such that any number of the plurality of motor controllers may be electrically connected to a single motor of the plurality of motors.

7. The method of claim 1, wherein at least two of the plurality of motor controllers share an output signal filter and further comprising supplying power from the at least two of the plurality of motor controllers, through the power switching network, through the output signal filter, and to the motor.

8. The method of claim 1, wherein at least one of the plurality of motor controllers does not comprise an output filter and further comprising supplying power from the at least one of the plurality of motor controllers with an unfiltered output, through the power switching network, and to the motor.

9. A motor control system, comprising:
   a plurality of motors;
   a plurality of motor controllers configured for parallel electrical connection; and
   a power switching network electrically connecting the plurality of motor controllers to the plurality of motors and operative to dynamically reconfigure at least one electrical connection to provide power from the plurality of motor controllers to a motor of the plurality of motors according to a present power load requirement of the motor.

10. The motor control system of claim 9, wherein each of the plurality of motor controllers comprises a maximum power output capability less than a maximum power load requirement of each of the plurality of motors.

11. The motor control system of claim 9, wherein the power switching network being operative to dynamically reconfigure at least one electrical connection to provide power from the plurality of motor controllers to the motor of the plurality of motors according to the present power load requirement of the motor comprises being operative to:

receive a request for a motor action that changes the present power load requirement on the motor of the plurality of motors, in response to the request for the motor action, reconfigure the power switching network such that power from one of the number of motor controllers is redirected to or from the motor to enable the motor action.

12. The motor control system of claim 9, wherein each of the plurality of motors drives an aircraft system and wherein the power switching network is further operative to detect a flight condition change and to dynamically reconfigure the electrical connections in response to detecting the flight condition change.

13. The motor control system of claim 9, wherein at least two of the plurality of motor controllers share an output signal filter such that electrical signals are transmitted from the at least two of the plurality of motor controllers, through the power switching network, through the output signal filter, and to the motor.

14. The motor control system of claim 9, wherein the plurality of motor controllers comprises a total number of motor controllers greater than a total number of motors of the plurality of motors, and wherein the power output capability of any one of the plurality of motor controllers is less than a maximum power load requirement of one motor of the plurality of motors.

15. The motor control system of claim 9, further comprising a vehicle, wherein the plurality of motors are operative to drive a plurality of vehicle systems.

16. A non-transitory computer storage medium having computer executable instructions stored thereon which, when executed by a computer, cause the computer to:

determine a present power load requirement for a motor of a plurality of motors;

configure a power switching network such that the motor is electrically connected to a number of parallel motor controllers that can provide the present power load requirement to the motor;

detect a change to the present power load requirement of the motor of the plurality of motors; and in response to detecting the change, reconfigure the power switching network to provide the present power load requirement to the motor.

17. The non-transitory computer storage medium of claim 16, wherein causing the computer to configure the power switching network such that the motor is electrically connected to the number of parallel motor controllers that can provide the present power load requirement to the motor comprises causing the computer to configure a plurality of electrical switches within a circuit comprising the parallel motor controllers to direct power from at least two motor controllers to the motor such that the power directed to the motor from the at least two motor controllers is greater than the present power load requirement of the motor.

18. The non-transitory computer storage medium of claim 16, wherein causing the computer to detect the change to the present power load requirement of the motor comprises causing the computer to receive a request for a motor action that changes the present power load requirement on the motor of the plurality of motors.

19. The non-transitory computer storage medium of claim 18, wherein causing the computer to reconfigure the power switching network to provide the present power load requirement to the motor comprises causing the computer to reconfigure the power switching network such that power from at least one of the number of motor controllers is redirected to or from the motor to enable the motor action.

20. The non-transitory computer storage medium of claim 16, wherein each of the plurality of motors drives an aircraft system and wherein causing the computer to detect the change to the present power load requirement of the motor of the plurality of motors comprises causing the computer to detect a flight condition change.

* * * * *